(12) United States Patent
Maginnis et al.

(10) Patent No.: US 11,099,043 B2
(45) Date of Patent: Aug. 24, 2021

(54) DETERMINING A CORRECTED MEASURED FLOW RATE

(71) Applicant: Micro Motion, Inc., Boulder, CO (US)

(72) Inventors: Richard L. Maginnis, Lafayette, CO (US); Dean M. Standiford, Loveland, CO (US)

(73) Assignee: Micro Motion, Inc., Boulder, CO (US)

( * ) Notice: Subject to any disclaimer, the term of this patent is extended or adjusted under 35 U.S.C. 154(b) by 188 days.

(21) Appl. No.: 16/073,642

(22) PCT Filed: Feb. 26, 2016

(86) PCT No.: PCT/US2016/019697
§ 371 (c)(1),
(2) Date: Jul. 27, 2018

(87) PCT Pub. No.: WO2017/146717
PCT Pub. Date: Aug. 31, 2017

(65) Prior Publication Data
US 2019/0033111 A1 Jan. 31, 2019

(51) Int. Cl.
*G01F 1/84* (2006.01)
*G01F 25/00* (2006.01)

(52) U.S. Cl.
CPC ........ *G01F 1/8436* (2013.01); *G01F 25/0007* (2013.01); *G01F 1/84* (2013.01)

(58) Field of Classification Search
CPC ....... G01F 1/8436; G01F 25/0007; G01F 1/84
See application file for complete search history.

(56) References Cited

U.S. PATENT DOCUMENTS

| 2012/0125123 | A1 | 5/2012 | Hays et al. |
| 2014/0123727 | A1 | 5/2014 | Weinstein et al. |
| 2015/0226597 | A1* | 8/2015 | Gaspard, Jr. ........ G01F 25/0007 73/1.16 |

FOREIGN PATENT DOCUMENTS

| EP | 0298567 A2 | 1/1989 |
| JP | 55096422 A | 7/1980 |

* cited by examiner

*Primary Examiner* — Peter J Macchiarolo
*Assistant Examiner* — Anthony W Megna Fuentes
(74) *Attorney, Agent, or Firm* — The Ollila Law Group LLC

(57) ABSTRACT

A method of determining a corrected measured flow rate is provided. The method includes measuring a flow rate with a first flow meter, measuring a flow rate with a second flow meter, the second flow meter being fluidly coupled to the first flow meter in series, and correcting the measured flow rate of the first flow meter with the measured flow rate of the second flow meter.

12 Claims, 5 Drawing Sheets

DETERMINING A CORRECTED MEASURED FLOW RATE

TECHNICAL FIELD

The embodiments described below relate to flow rate measurements and, more particularly, to determining a corrected measured flow rate.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow. The zero offset may be referred to as a meter zero.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

Many systems utilize two or more meter assemblies due to various design constraints. For example, meter assemblies used in dispensing liquid natural gas (LNG) to LNG vehicles may utilize a first meter assembly to measure fuel pumped from an LNG storage tank to the LNG vehicle. A second meter assembly may be used to measure the fuel that is returned to the LNG tank. The fuel returned to the LNG tank may have a different flow rate, temperature, state, etc. When fuel is not consumed by the LNG vehicle, the mass flow rates measured by the first and second flow meter must be the same. However, some flow meters, such as larger flow meters, may have meter zeroes that vary or drift. This variation or drift may be referred to as zero flow instability. Due to the zero flow instability, the flow rates measured by the first and second flow meter may be different even though the flow rates are actually the same. Accordingly, there is a need for determining a corrected measured flow rate.

SUMMARY

A method of determining a corrected measured flow rate is provided. According to an embodiment, the method comprises measuring a flow rate with a first flow meter, measuring a flow rate with a second flow meter, the second flow meter being fluidly coupled to the first flow meter in series, and correcting the measured flow rate of the first flow meter with the measured flow rate of the second flow meter.

A dual flow meter system for determining a corrected measured flow rate is provided. According to an embodiment, the dual flow meter system comprises a first flow meter, a second flow meter fluidly coupled in series with the first flow meter, and at least one meter electronics communicatively coupled to the first flow meter and the second flow meter. The at least one meter electronics is configured to correct the measured flow rate of the first flow meter with the measured flow rate of the second flow meter.

A fluid control system is provided. According to an embodiment, the fluid control system comprises a supply line with a first flow meter, a return line with a second flow meter fluidly coupled in series with the first flow meter, and one or more meter electronics communicatively coupled to the first flow meter and the second flow meter, wherein at least one of a system controller communicatively coupled to the one or more meter electronics and the one or more meter electronics is configured to correct the measured flow rate of the first flow meter with the measured flow rate of the second flow meter.

Aspects

According to an aspect, a method of determining a corrected measured flow rate comprises measuring a flow rate with a first flow meter, measuring a flow rate with a second flow meter, the second flow meter being fluidly coupled to the first flow meter in series, and correcting the measured flow rate of the first flow meter with the measured flow rate of the second flow meter.

Preferably, correcting the measured flow rate of the first flow meter comprises summing the measured flow rate of the second flow meter with the measured flow rate of the first flow meter.

Preferably, correcting the measured flow rate of the first flow meter comprises correcting the measured flow rate of the first flow meter with an estimated zero flow instability of the first flow meter, the estimated zero flow instability being comprised of a difference between the measured flow rate of the first flow meter and the measured flow rate of the second flow meter.

Preferably, the flow rate of the first flow meter and the flow rate of the second flow meter are measured substantially simultaneously.

Preferably, the flow rate of the second flow meter is measured prior to the measured flow rate of the first flow meter.

According to an aspect, a dual flow meter system (5) for determining a corrected measured flow rate comprises a first flow meter (5a), a second flow meter (5b) fluidly coupled in series with the first flow meter (5a), and at least one meter electronics (100) communicatively coupled to the first flow meter (5a) and the second flow meter (5b), the at least one meter electronics (100) being configured to correct the measured flow rate of the first flow meter (5a) with the measured flow rate of the second flow meter (5b).

Preferably, the one or more meter electronics (100) configured to correct the measured flow rate of the first flow meter (5a) comprises the meter electronics (100) being configured to sum the measured flow rate of the second flow meter (5b) with the measured flow rate of the first flow meter (5a).

Preferably, the one or more meter electronics (100) configured to correct the measured flow rate of the first flow meter (5a) comprises the one or more meter electronics (100) configured to correct the measured flow rate of the first flow meter (5a) with an estimated zero flow instability of the first flow meter (5a), the estimated zero flow instability being comprised of a difference between the measured flow rate of the first flow meter (5a) and the measured flow rate of the second flow meter (5b).

Preferably, the flow rate of the first flow meter (5a) and the flow rate of the second flow meter (5b) are measured substantially simultaneously.

Preferably, the flow rate of the second flow meter (5b) is measured prior to the measured flow rate of the first flow meter (5a).

According to an aspect, a fluid control system (400) for determining a corrected measured flow rate comprises a supply line (SL) with a first flow meter (5a), a return line (RL) with a second flow meter (5b) fluidly coupled in series with the first flow meter (5a), and one or more meter electronics (100) communicatively coupled to the first flow meter (5a) and the second flow meter (5b), wherein at least one of a system controller (410) is communicatively coupled to the one or more meter electronics (100) and the one or more meter electronics (100) is configured to correct the measured flow rate of the first flow meter (5a) with the measured flow rate of the second flow meter (5b).

Preferably, the at least one of the system controller (410) and the one or more meter electronics (100) configured to correct the measured flow rate of the first flow meter (5a) comprises the at least one of the system controller (410) and the meter electronics (100) being configured to sum the measured flow rate of the second flow meter (5b) with the measured flow rate of the first flow meter (5a).

Preferably, at least one of the system controller (410) and the one or more meter electronics (100) configured to correct the measured flow rate of the first flow meter (5a) comprises the at least one of the system controller (410) and the one or more meter electronics (100) configured to correct the measured flow rate of the first flow meter (5a) with an estimated zero flow instability of the first flow meter (5a), the estimated zero flow instability being comprised of a difference between the measured flow rate of the first flow meter (5a) and the measured flow rate of the second flow meter (5b).

Preferably, the flow rate of the first flow meter (5a) and the flow rate of the second flow meter (5b) are measured substantially simultaneously.

Preferably, the flow rate of the second flow meter (5b) is measured prior to the measured flow rate of the first flow meter (5a).

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of determining a corrected measured flow rate. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of determining the corrected measured flow rate. As a result, the embodiments described below are not limited to the specific examples described below, but only by the claims and their equivalents.

Determining the corrected measured flow rate may include measuring a flow rate with a first flow meter and a second flow meter. For example, the first and second flow meter may be fluidly coupled in series and, therefore, the same fluid flow is measured by the first and second flow meter. However, the first flow meter may be inaccurate due to zero flow instability of the first flow meter. As a result, the flow rate measured by the second flow meter may be more accurate than the flow rate measured by the first flow meter. The zero flow instability of the first flow meter may be greater than the zero flow instability of the second flow meter.

Accordingly, the measured flow rate of the first flow meter may be corrected with the measured flow rate of the second flow meter. For example, the second flow rate may be summed with the measured flow rate of the first flow meter. Summing the measured flow rate may include obtaining an estimated zero flow instability of the first flow meter, which may be a difference between the measured flow rates of the first and second flow meter. Therefore, the corrected measured flow rates of the first flow meter may be more accurate than the measured flow rates.

Dual Flow Meter System

Figure 1:
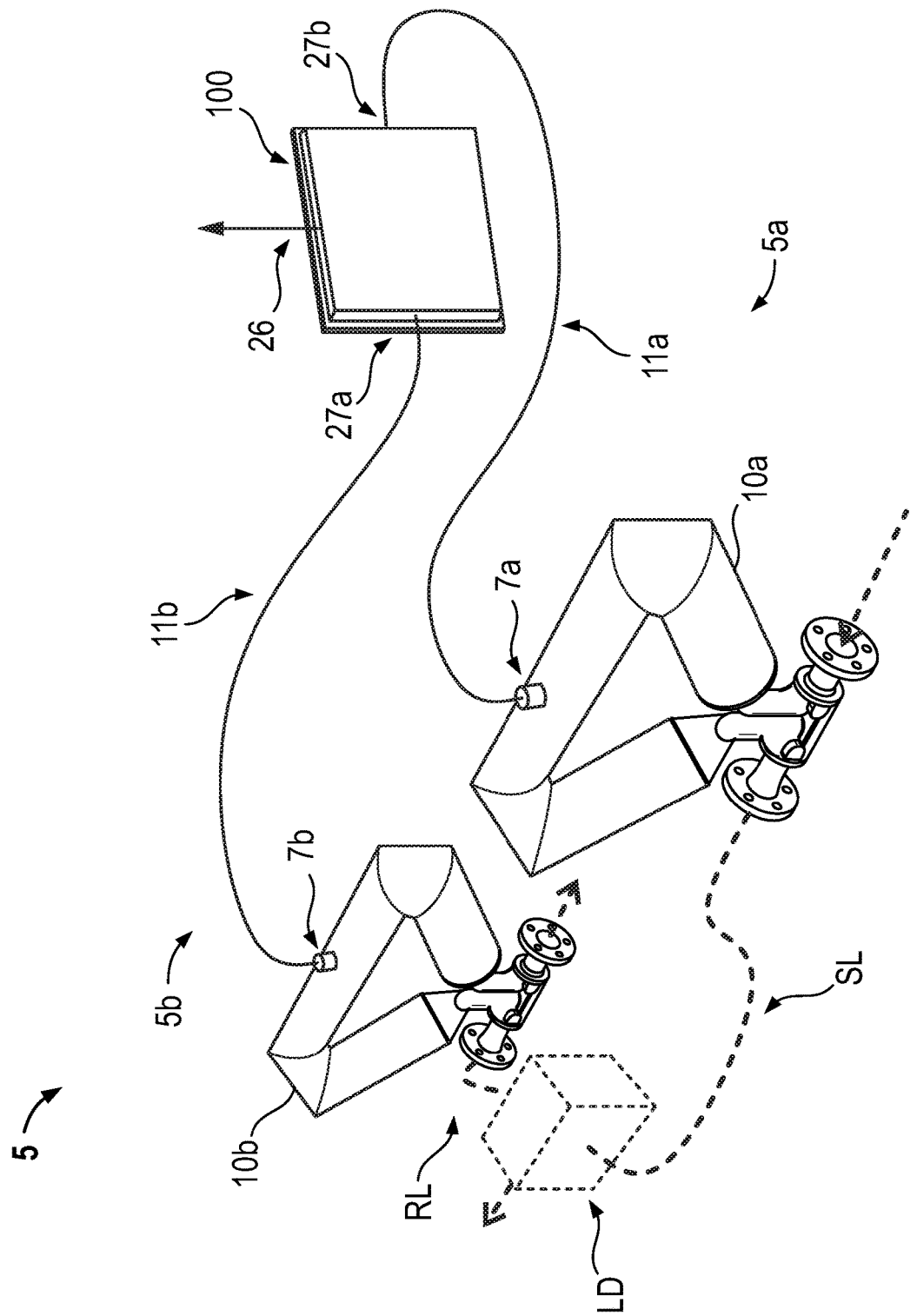
FIG. 1 shows a dual flow meter system 5 for determining a corrected measured flow rate.

FIG. 1 shows a dual flow meter system 5 for determining a corrected measured flow rate. As shown in FIG. 1, the dual flow meter system 5 includes a first flow meter 5a and a second flow meter 5b. The first and second flow meter 5a, 5b are respectively comprised of the meter electronics 100 and the first and second meter assembly 10a, 10b.

The meter electronics 100 is communicatively coupled to the first and second meter assembly 10a, 10b via a first and second set of leads 11a, 11b. The first and second set of leads 11a, 11b are coupled (e.g., attached, affixed, etc.) to a first and second communication port 27a, 27b on the meter electronics 100. The first and second set of leads 11a, 11b are also coupled to the first and second meter assembly 10a, 10b via a first and second communication port 7a, 7b on the first and second meter assembly 10a, 10b. The meter electronics 100 is configured to provide information over path 26 to a host. The first and second meter assembly 10a, 10b are shown with a case that surrounds flow tubes. The meter electronics 100 and first and second meter assembly 10a, 10b are described in more detail in the following with reference to FIGS. 2 and 3.

Still referring to FIG. 1, the first and second flow meter 5a, 5b can be used to, for example, calculate a difference in flow rate and/or total flow between a supply line SL and a return line RL. More specifically, the dual flow meter system 5 may be employed in a cryogenic application where fluid is supplied from a tank in liquid state and then returned to the tank in a gaseous state. In one exemplary cryogenic application, the first meter assembly 10a may be part of the supply line SL that supplies LNG to an LNG dispenser LD and the second meter assembly 10b may be part of a return line RL from the LNG dispenser LD. The total flow through the second meter assembly 10b can be subtracted from the total flow through the first meter assembly 10a to determine the total amount of LNG supplied to the LNG vehicle. This exemplary application with the supply and return line SL, RL is shown with dashed lines to illustrate that the dual flow meter system 5 can be employed in other applications. Other cryogenic fluids may be employed, such as hydrogen, or the like. As can also be appreciated, in the described and other embodiments, the calculations can be performed by the meter electronics 100, which is described in more detail in the following.

Figure 2:
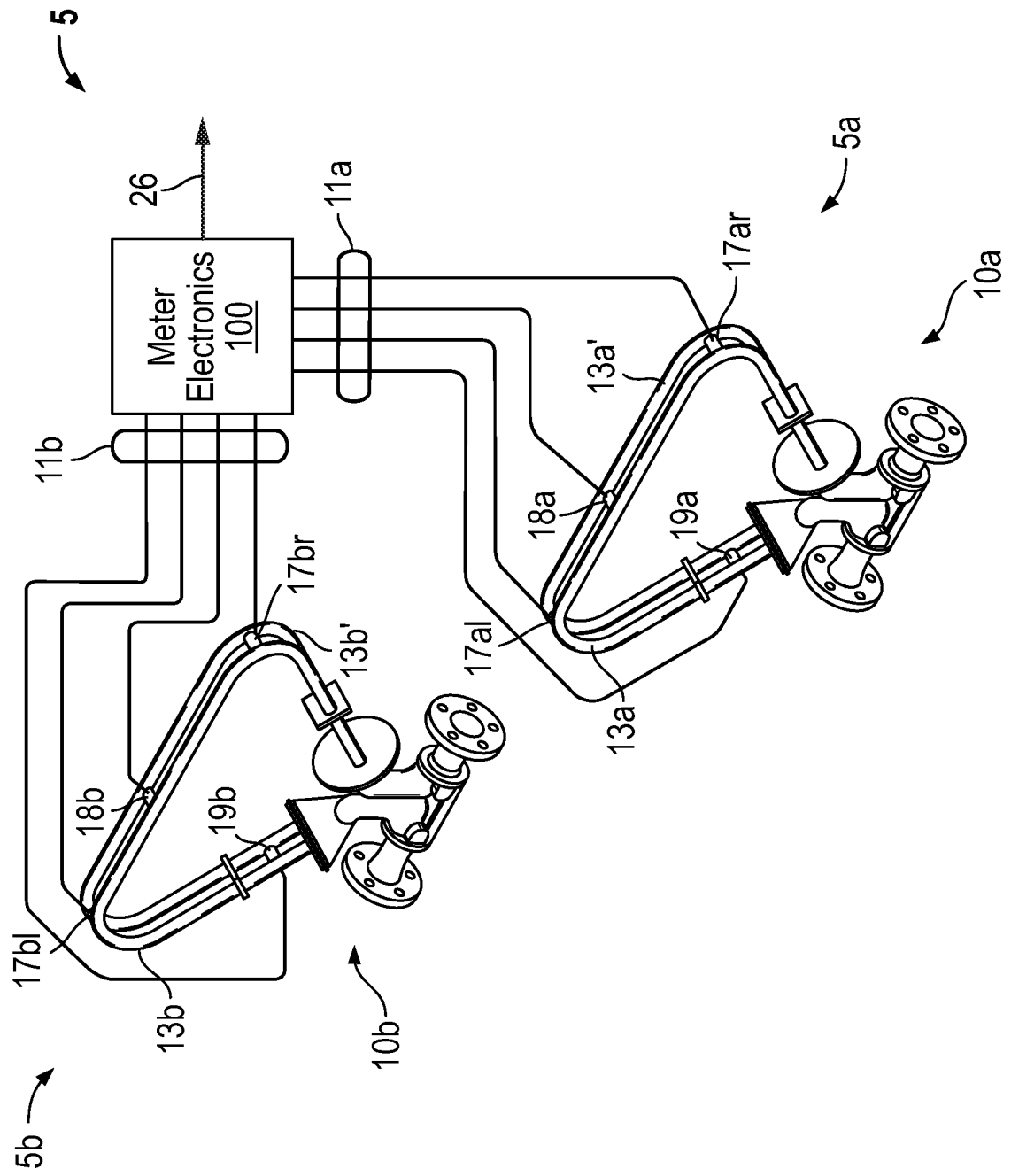
FIG. 2 shows the dual flow meter system 5 for determining the corrected measured flow rate.

FIG. 2 shows the dual flow meter system 5 for determining the corrected measured flow rate. As shown in FIG. 2, the dual flow meter system 5 includes the first flow meter 5a and the second flow meter 5b described in the foregoing with reference to FIG. 1. The cases on the meter electronics 100 and first and second meter assembly 10a, 10b are not shown for clarity. The first and second meter assembly 10a, 10b respond to mass flow rate and density of a process material. The meter electronics 100 is connected to the first and second meter assembly 10a, 10b via a first and second set of leads 11a, 11b to provide density, mass flow rate, and temperature information over the path 26, as well as other information. A Coriolis flow meter structure is described although it is apparent to those skilled in the art that the present invention could be practiced with alternative flowmeters.

The first and second meter assembly 10a, 10b include a pair of parallel conduits 13a, 13a' and 13b, 13b', a first and second drive mechanism 18a, 18b, temperature sensor 19a, 19b, and pair of left and right pick-off sensors 17a1, 17ar and 17b1, 17br. Each of the pair of conduits 13a, 13a' and 13b, 13b' bend at two symmetrical locations along the conduits 13a, 13a' and 13b, 13b' length and are essentially parallel throughout their length. The conduits 13a, 13a' and 13b, 13b' are driven by the drive mechanisms 18a, 18b in opposite directions about their respective bending axes and at what is termed the first out-of-phase bending mode of the flow meter. The drive mechanisms 18a, 18b may comprise any one of many arrangements, such as a magnet mounted to the conduits 13a', 13b' and an opposing coil mounted to the conduits 13a, 13b and through which an alternating current is passed for vibrating both conduits 13a, 13a' and 13b, 13b'. A suitable drive signal is applied by the meter electronics 100 to the drive mechanism 18a, 18b.

The first and second flow meter 5a, 5b can be initially calibrated and a flow calibration factor FCF, along with a zero offset $\Delta T_0$, can be generated. In use, the flow calibration factor FCF can be multiplied by the time delay $\Delta T$ measured by the pickoffs minus the zero offset $\Delta T_0$ to generate a mass flow rate $\dot{m}$. An example of a mass flow rate equation utilizing a flow calibration factor FCF and a zero offset $\Delta T_0$ is described by Equation (1):

$$\dot{m} = FCF(\Delta T_{measured} - \Delta T_0) \quad (1)$$

Where:
 $\dot{m}$=mass flow rate
 FCF=flow calibration factor
 $\Delta T_{measured}$=measured time delay
 $\Delta T_0$=initial zero offset The temperature sensors 19a, 19b are mounted to conduits 13a', 13b' to continuously measure the temperature of the conduits 13a', 13b'. The temperature of the conduits 13a', 13b' and hence the voltage appearing across the temperature sensors 19a, 19b for a given current is governed by the temperature of the material passing through the conduits 13a', 13b'. The temperature dependent voltages appearing across the temperature sensors 19a, 19b may be used by the meter electronics 100 to compensate for the change in elastic modulus of the conduits 13a', 13b' due to any changes in conduit temperature. In the embodiment shown, the temperature sensors 19a, 19b are resistive temperature detectors (RTD). Although the embodiments described herein employ RTD sensors, other temperature sensors may be employed in alternative embodiments, such as thermistors, thermocouples, etc.

The meter electronics 100 receives the left and right sensor signals from the first and second left and right pick-off sensors 17a1, 17ar and 17b1, 17br and the temperature signals from the first and second temperature sensor 19a, 19b via the first and second set of leads 11a, 11b. The meter electronics 100 provides a drive signal to the drive mechanism 18a, 18b and vibrates the first and second pair of conduits 13a, 13a' and 13b, 13b'. The meter electronics 100 processes the left and right sensor signals and the temperature signals to compute the mass flow rate and the density of the material passing through the first and/or second meter assembly 10a, 10b. This information, along with other information, is applied by meter electronics 100 over path 26 as a signal.

As can be appreciated, although the dual flow meter system 5 shown in FIGS. 1 and 2 includes only two meter assemblies 10a, 10b, the dual flow meter system 5 may be employed in systems that include more than two meter assemblies. For example, a meter electronics may be configured to communicate with three or more meter assemblies. In such a configuration, the dual flow meter system 5 may be a portion of the meter electronics and two of the three or more meter assemblies.

Meter Electronics

Figure 3:
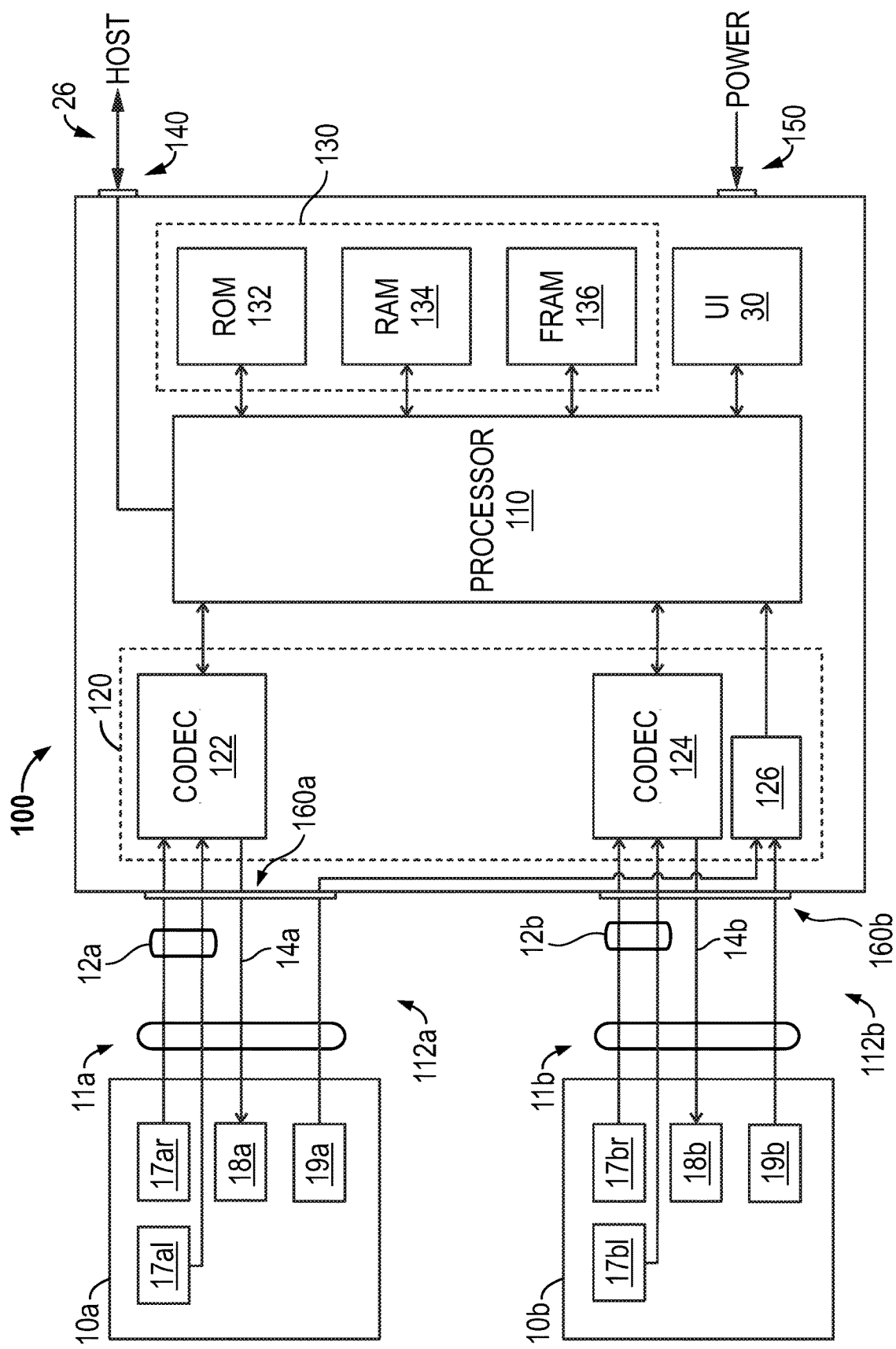
FIG. 3 shows a block diagram of the meter electronics 100.

FIG. 3 shows a block diagram of the meter electronics 100. As shown in FIG. 3, the meter electronics 100 is communicatively coupled to the first and second meter assembly 10a, 10b. As described in the foregoing with reference to FIG. 1, the first and second meter assembly 10a, 10b include the first and second left and right pick-off sensors 17a1, 17ar and 17b1, 17br, drive mechanism 18a, 18b, and temperature sensor 19a, 19b, which are communicatively coupled to the meter electronics 100 via the first and second set of leads 11a, 11b through a first and second communication channel 112a, 112b and a first and second I/O port 160a, 160b.

The meter electronics 100 provides a first and second drive signal 14a, 14b via the leads 11a, 11b. More specifically, the meter electronics 100 provides a first drive signal 14a to the first drive mechanism 18a in the first meter assembly 10a. The meter electronics 100 is also configured to provide a second drive signal 14b to the second drive mechanism 18b in the second meter assembly 10b. In addition, a first and second sensor signal 12a, 12b are respectively provided by the first and second meter assembly 10a, 10b. More specifically, in the embodiment shown, the first sensor signal 12a is provided by the first left and right pick-off sensor 17a1, 17ar in the first meter assembly 10a. The second sensor signal 12b is provided by the second left and right pick-off sensor 17b1, 17br in the second meter assembly 10b. As can be appreciated, the first and second sensor signal 12a, 12b are respectively provided to the meter electronics 100 through the first and second communication channel 112a, 112b.

The meter electronics 100 includes a processor 110 communicatively coupled to one or more signal processors 120 and one or more memories 130. The processor 110 is also communicatively coupled to a user interface 30. The processor 110 is communicatively coupled with the host via a communication port 140 over the path 26 and receives electrical power via an electrical power port 150. The processor 110 may be a microprocessor although any suitable processor may be employed. For example, the processor 110 may be comprised of sub-processors, such as a multi-core processor, serial communication ports, peripheral interfaces (e.g., serial peripheral interface), on-chip memory, I/O ports, and/or the like. In these and other embodiments, the processor 110 is configured to perform operations on received and processed signals, such as digitized signals.

The processor 110 may receive digitized sensor signals from the one or more signal processors 120. The processor 110 is also configured to provide information, such as a phase difference, a property of a fluid in the first or second meter assembly 10a, 10b, or the like. The processor 110 may provide the information to the host through the communication port 140. The processor 110 may also be configured to communicate with the one or more memories 130 to receive and/or store information in the one or more memories 130. For example, the processor 110 may receive calibration factors and/or meter assembly zeros (e.g., phase difference when there is zero flow) from the one or more memories 130. Each of the calibration factors and/or meter assembly zeros may respectively be associated with the first and second flow meter 5a, 5b and/or the first and second meter assembly 10a, 10b. The processor 110 may use the calibration factors to process digitized sensor signals received from the one or more signal processors 120.

The one or more signal processors 120 is shown as being comprised of a first and second encoder/decoder (CODEC) 122, 124 and an analog-to-digital converter (ADC) 126. The one or more signal processors 120 may condition analog signals, digitize the conditioned analog signals, and/or provide the digitized signals. The first and second CODEC 122, 124 are configured to receive the left and right sensor signal from the first and second left and right pick-off sensors 17a1, 17ar and 17b1, 17br. The first and second CODEC 122, 124 are also configured to provide the first and second drive signal 14a, 14b to the first and second drive mechanism 18a, 18b. In alternative embodiments, more or fewer signal processors may be employed. For example, a single CODEC may be employed for the first and second sensor signal 12a, 12b and first and second drive signal 14a, 14b. Additionally or alternatively, two ADCs may be employed instead of the single ADC 126.

In the embodiment shown, the one or more memories 130 is comprised of a read-only memory (ROM) 132, random access memory (RAM) 134, and a ferroelectric random-access memory (FRAM) 136. However, in alternative embodiments, the one or more memories 130 may be comprised of more or fewer memories. Additionally or alternatively, the one or more memories 130 may be comprised of different types of memory (e.g., volatile, non-volatile, etc.). For example, a different type of non-volatile memory, such as, for example, erasable programmable read only memory (EPROM), or the like, may be employed instead of the FRAM 136.

As can also be appreciated, although the dual flow meter system 5 shown in FIG. 3 includes only two meter assemblies 10a, 10b, the dual flow meter system 5 may be employed in systems that include more than two meter assemblies. For example, a meter electronics may be configured to communicate with three or more meter assemblies. In such a configuration, the dual flow meter system 5 may be a portion of the meter electronics and two of the three or more meter assemblies.

As can be appreciated, when the first and second flow meter 5a, 5b are in series, the flow rates through the first and second flow meter 5a, 5b may be the same. For example, with reference to the configuration shown in FIG. 1, when the LNG dispenser LD is not dispensing fluid to a vehicle, mass flow rates through the first and second flow meter 5a, 5b should be the same. However, flow rates measured by the first and second flow meter 5a, 5b may not be the same due to zero flow instability. The zero flow instability of the first flow meter 5a may be greater than the zero flow instability of the second flow meter 5b.

For example, the first flow meter 5a, due to supplying fluid, may have a larger pipe diameter than the second flow meter 5b. Due to the larger pipe diameter, the meter zero of the first flow meter 5a may vary or drift more than the meter zero of the second flow meter 5b. Accordingly, to perform flow rate measurements with the first flow meter 5a, the flow rate measurements by the first flow meter 5a may be corrected by the flow rate measurements of the second flow meter 5b, as the following discusses in more detail.

System

Figure 4:
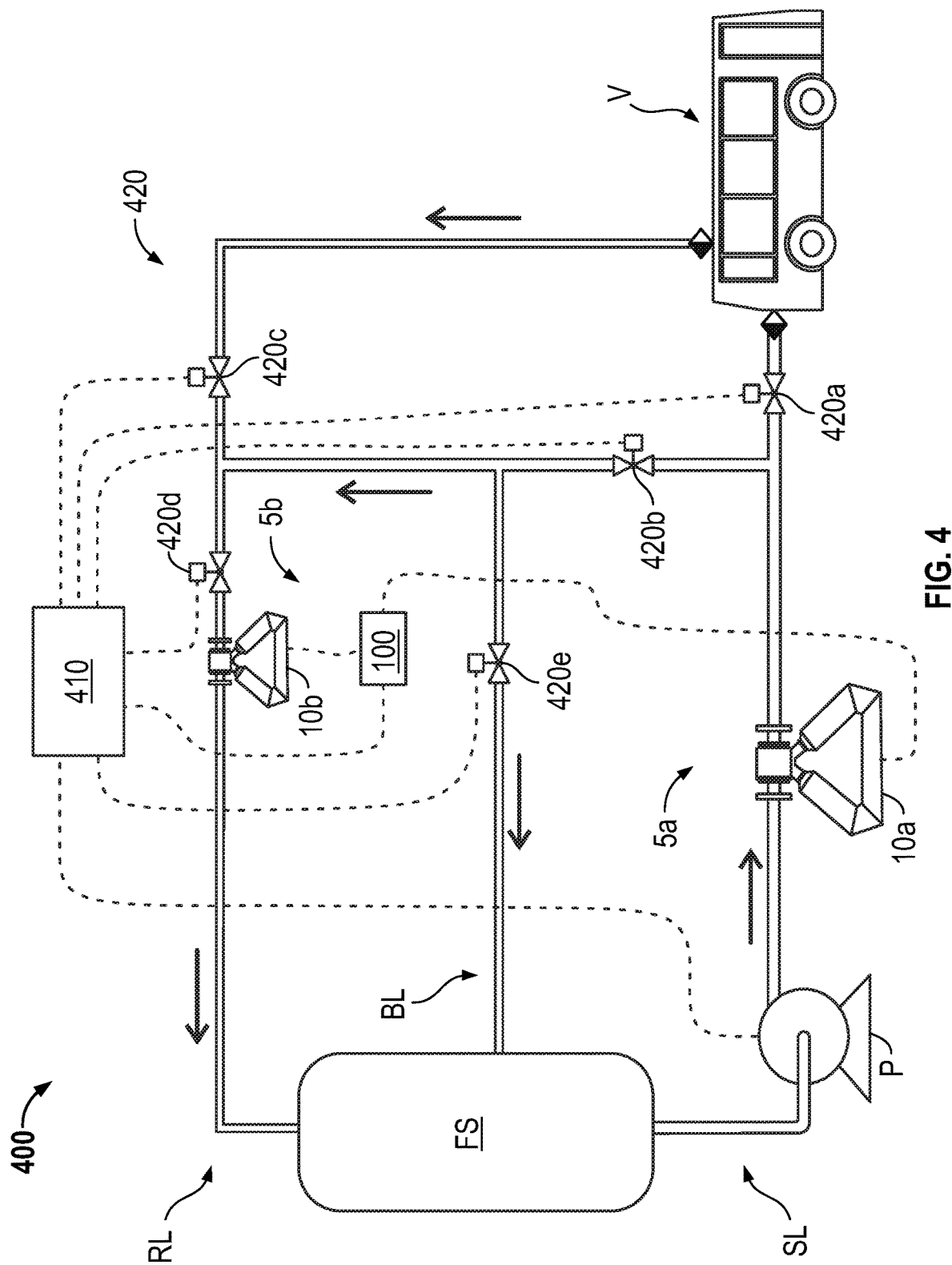
FIG. 4 shows a fluid control system 400 for determining the corrected measured flow rate.

FIG. 4 shows a fluid control system 400 for determining the corrected measured flow rate. As shown in FIG. 4, the fluid control system 400 is a fuel control system that includes a fuel source FS fluidly coupled to a vehicle V. The fuel source FS is fluidly coupled to the vehicle V via a supply line SL, return line RL, and a bypass line BL. The fluid control system 400 includes the dual flow meter system 5 described in the foregoing. The fluid control system 400 also includes a system controller 410 that is communicatively coupled to valves 420 via communication lines illustrated as dashed lines. The system controller 410 is also communicatively coupled to the dual flow meter system 5.

The fuel source FS provides fuel to the vehicle V via the supply line SL. The fuel may be provided to the vehicle V in liquid form. As shown, the supply line SL is comprised of the pump P and first flow meter 5a fluidly coupled to the fuel source FS and the vehicle V. The first flow meter 5a is configured to measure a flow rate through the supply line SL. The flow rate through the supply line SL may be a fuel supply flow rate to the vehicle V.

The fuel source FS may receive the fuel from the vehicle V via the return line RL and from the supply line SL via the bypass line BL. The fuel may be provided to the fuel source FS via the return line RL and bypass line BL in gaseous form. The bypass line BL is shown as not including a flow meter. The return line RL may be comprised of the second flow meter 5b fluidly coupled to the fuel source FS and the vehicle V. The second flow meter 5*b* may measure the flow rate of the fuel returned to the fuel source FS via the return line RL.

The valves 420 control the flow paths of the fuel through the fluid control system 400. The valves 420 include a first valve 420*a* fluidly coupled to the first meter assembly, the vehicle V, and a second valve 420*b*. When the first valve 420*a* is open, the fuel flowing through the supply line SL is provided to the vehicle V. When the first valve 420*a* is closed, the fuel in the supply line SL is not provided to the vehicle V. The second valve 420*b* can also control the flow through the vehicle V.

For example, if the first valve 420*a* is open and the second valve 420*b* is closed, then the fuel will only flow through the vehicle V. The fuel flow through the vehicle V may also be controlled by a third valve 420*c*, which is fluidly coupled to the vehicle V, return line RL, and bypass line BL. If the first valve 420*a* is closed and the second valve 420*b* is open, then the fuel will not flow through the vehicle V. Instead, the fuel will flow through the return line RL or the bypass line BL.

The fuel flow through the return line RL and the bypass line BL may be controlled with the fourth and fifth valve 420*d*, 420*e*. If the fourth valve 420*d* is open and the fifth valve 420*e* is closed, then the fuel may flow through the return line RL to the fuel source FS. If the fourth valve 420*d* is closed and the fifth valve 420*e* is open, then the fuel can flow through the fifth valve 420*e* in the bypass line BL into the fuel source FS. In other embodiments, the fourth valve 420*d*, may not be employed. Accordingly, the fuel flow can flow through the return line RL by closing the first, third, and fifth valve 420*a*, 420*c*, 420*e*.

As can be appreciated, the flow rates of the fuel through the supply line SL and the return line RL may be measured by the dual flow meter system 5. The dual flow meter system 5 is comprised of the first and second flow meter 5*a*, 5*b* described in the foregoing. As shown in FIG. 4, the first flow meter 5*a* is comprised of the meter electronics 100 and the first meter assembly 10*a*. The second flow meter 5*b* is comprised of the meter electronics 100 and the second meter assembly 10*b*. Although a single meter electronics 100 is shown, the meter electronics 100 may be comprised of one or more meter electronics. For example, the meter electronics 100 shown in FIG. 4, may be comprised of a first meter electronics communicatively coupled to the first meter assembly 10*a* and a second meter electronics coupled to the second meter assembly 10*b*. As shown, the meter electronics 100 is communicatively coupled to the first and second meter assembly 10*a*, 10*b* via communication lines illustrated as dashed lines. The meter electronics 100 is also communicatively coupled with the system controller 410.

The system controller 410 may be a host, such as the host communicatively coupled to the meter electronics 100 via the path 26 in FIGS. 1-3. The system controller 410 may include, for example, a processor communicatively coupled to a memory, hard drive, etc. The system controller 410 is shown as a single integrated assembly although any suitable configuration may be employed. For example, the system controller 410 may be a software instance that performs operations in a distributed computing environment. The system controller 410 is configured to send and/or receive communications via the communications lines. As shown in FIG. 4, the system controller 410 can send and/or receive communications to and from the pump P, valves 420, and dual flow meter system 5 to determine a corrected measured flow rate, as the discussion illustrates.

The system controller 410 and/or meter electronics 100 may employ the following equations (2)-(5) to correct the measured flow rate of the first flow meter 5*a*. In the following equation (2):

$$\dot{m}_a = \text{FCF}(\Delta t - t_0), \quad (2)$$

a measured flow rate $\dot{m}_a$, is a flow rate measured by the first flow meter 5*a*. The measured flow rate $\dot{m}_a$ of the first flow meter 5*a* may be an uncorrected flow rate. That is, even though the measured flow rate $\dot{m}_a$ is determined using the flow calibration factors FCF and meter zero $t_0$ (also referred to as zero offset, etc.) of the first meter assembly 10*a*, the measured flow rate $\dot{m}_a$ may not yet be corrected by a flow rate measured by the second flow meter 5*b*.

In the fluid control system 400, where the first and second flow meter 5*a*, 5*b* are fluidly coupled in series, the flow rates measured by the first and second flow meter 5*a*, 5*b* may be equal. For example, if the first, third, and fifth valve 420*a*, 420*c*, 420*e* are closed and the second and fourth valve 420*b*, 420*d* are open, then the measured flow rates of the first and second flow meter 5*a*, 5*b* may be equal, resulting in the following relationship (3):

$$\dot{m}_b \stackrel{\text{def}}{=} \dot{m}_b. \quad (3)$$

The foregoing relationship (3) indicates that, the measured flow rate $m_a$ of the first flow meter 5*a* may be corrected using the following equation (4):

$$\dot{m}_0 = \dot{m}_b - \dot{m}_a, \quad (4)$$

Where:

$\widehat{m_0}$ is an estimated zero flow instability of the first flow meter 5*a*;

$\dot{m}_a$ is the measured flow rate of the first flow meter 5*a*; and $\dot{m}_b$ is the measured flow rate of the second flow meter 5*b*.

As can be appreciated, a dominant error term in the measured flow rate $\dot{m}_a$ of the first flow meter 5*a* may be due to zero flow instability in the first flow meter 5*a*. Accordingly, the measured flow rate $\dot{m}_a$ of the first flow meter 5*a* may be corrected using the estimated zero flow instability $\widehat{m_0}$. For example, the following equation (5):

$$\widehat{\dot{m}_a} = \text{FCF}(\Delta t - t_0) - \widehat{m_0}, \quad (5)$$

may be used to obtain a corrected measured flow rate, where:

$\widehat{\dot{m}_a}$ is the corrected measured flow rate;

FCF is the flow calibration factor; and $t_0$ is the meter zero;

of the first flow meter 5*a*.

Correcting the measured flow rate of the first flow meter 5*a* can, for example, extend a range of the first flow meter 5*a*. The range may be extended in a turn-down of the first flow meter 5*a*. The turn-down of the first flow meter 5*a* may be a band of low flow rates just above a zero flow where the measurement signal cannot be distinguished from noise, e.g., flows too low to be accurately measured. Correcting the measured flow rate of the first flow meter 5*a* can also compensate for the impact of the zero flow instability of the first flow meter 5*a*. In addition, in applications where measured flow rates of smaller flow meters (e.g., 0.25 in.) are used to correct measured flow rates of larger flow meters (e.g., 1.0 in.), the ability to use the larger flow meter to measure flow rates, rather than the smaller flow meter, can result in higher flow rates, thereby, for example, reducing fill times of the vehicle V. The size ratio between the first and second flow meter 5*a*, 5*b* that could result in desirably accurate corrected measured flow rate $\widehat{\dot{m}_a}$ may be greater than 4, although any suitable ratio may be employed.

The flow rates measured by the first and second flow meter 5a, 5b may be measured substantially simultaneously. For example, as shown in FIG. 4, the meter electronics 100 is communicatively coupled with the first and second meter assembly 10a, 10b. Accordingly, the flow rates of the fuel flowing through the first and second meter assembly 10a, 10b may be measured as substantially simultaneously. In contrast, when two meter electronics are employed, each of the two meter electronics may employ a separate clock. The two clocks may have slightly different timing. Accordingly, flow rate measurements made using the two meter electronics, even if made at the same time, may have different rates. Other errors may be associated with using different meter electronics to perform the flow rate measurements. In addition, two meters may be configured to substantially simultaneously measure the flow rates.

Measuring the flow rates substantially simultaneously may ensure that the foregoing relationship (3) is a correct assumption. Accordingly, the estimated zero flow instability $\hat{m}_0$ may accurately characterize zero flow instability of the first flow meter 5a. The estimated zero flow instability $\hat{m}_0$ may be employed to correct a measured flow rate, as the following discussion illustrates.

Method

Figure 5:
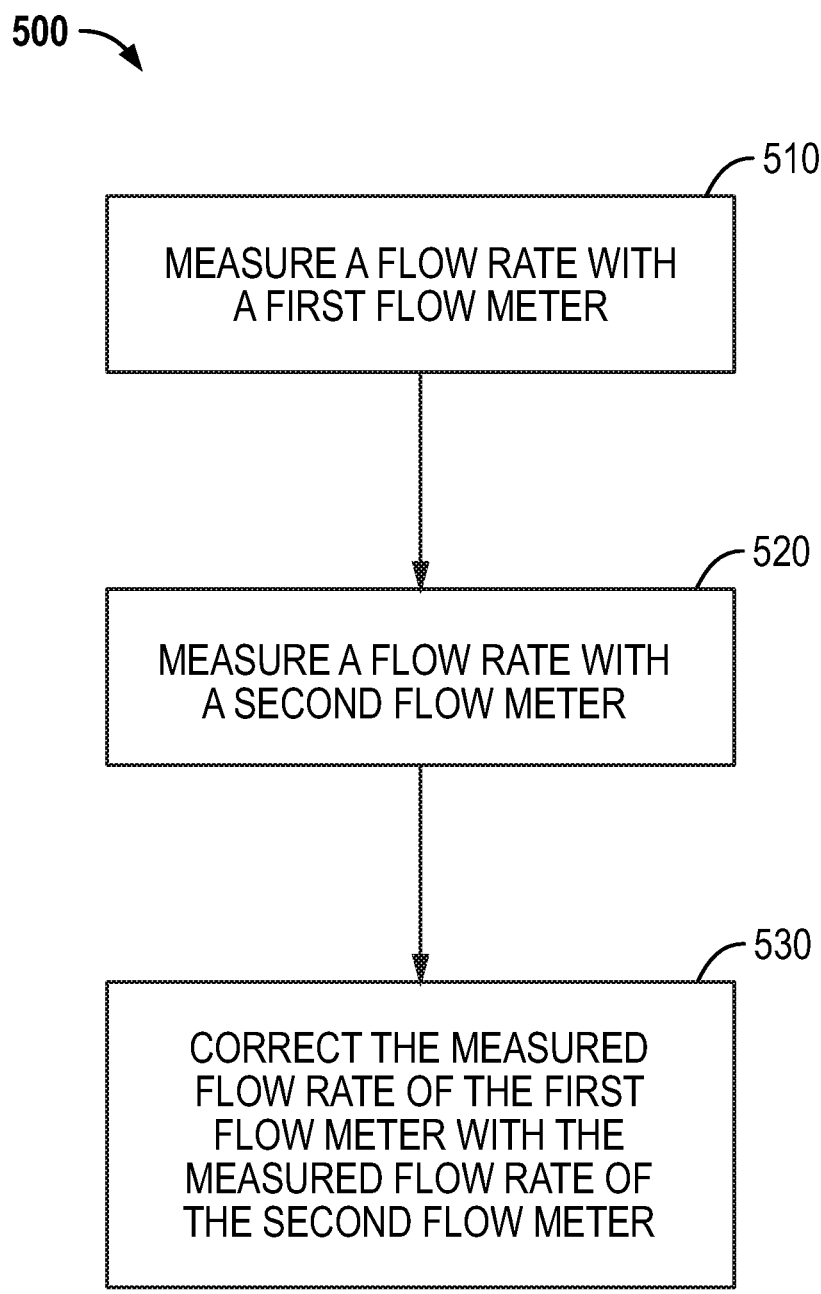
FIG. 5 shows a method 500 of determining a corrected measured flow rate.

FIG. 5 shows a method 500 of determining a corrected measured flow rate. As shown in FIG. 5, in step 510, the method 500 measures a flow rate with a first flow meter. The first flow meter may be the first flow meter 5a described in the foregoing with reference to FIG. 4. The method 500 also measures a flow rate with a second flow meter in step 520, which may be the second flow meter 5b described in the foregoing with reference to FIG. 4. The second flow meter may be fluidly coupled to the first flow meter in series. For example, with reference to FIG. 4, the second flow meter 5b may be fluidly coupled to the first flow meter 5a in series via the second and fourth valve 420b, 420d, which are open while the first, third, and fifth valve 420a, 420c, 420e are closed. In other embodiments, the fourth valve 420b may not be employed. Accordingly, the first and second flow meters 5a, 5b may be fluidly coupled in series only via the second valve 420b. Alternatively, the first and second flow meter 5a, 5b may be fluidly coupled in series via the vehicle V when the first, third, and fourth valve 420a, 420c, 420d are open and the second and fifth valve 420b, 420e are closed.

In step 510, the flow rate measured by the first flow meter may be measured by the first flow meter 5a shown in FIG. 4, which is comprised of the first meter assembly 10a and the meter electronics 100. The flow rate measured by the first flow meter 5a may be a flow rate of the fuel when fuel is not being provided to the vehicle V. For example, as discussed in the foregoing, the fuel may flow through the first and second flow meter 5a, 5b without flowing through the vehicle V and the bypass line BL.

In step 520, the flow rate of the fuel may be measured by the second flow meter 5b, which may be in series with the first flow meter 5a. As can be appreciated, the flow rate measured by the second flow meter 5b may be due to the fuel flowing from the vehicle V through the third valve 420c and/or flowing from first flow meter 5a through the second valve 420b. As can be appreciated, the flow rate of the fuel through the second flow meter 5b may be the same as or different than the flow rate through the first flow meter 5a, depending on, for example, which of the valves 420 are open or closed.

The valves 420 may be open and closed such that the fuel only flows through the supply line SL and return line RL. Due to the fuel only flowing through the supply line SL and the return line RL, the flow rate of the fuel flowing through the first flow meter 5a is substantially the same as the flow rate of the fuel flowing through the second flow meter 5b. Accordingly, the flow rate measured by the first flow meter 5a may be the same as the flow rate measured by the second flow meter 5b. However, due to zero flow instability of one of the first and second flow meter 5a, 5b, the measured flow rates of the first and second flow meter 5a, 5b may not be the same.

In step 530, the measured flow rate of the first flow meter may be corrected with the measured flow rate of the second flow meter. For example, with reference to the fluid control system 400 shown in FIG. 4, the measured flow rate of the first flow meter 5a may be corrected by the measured flow rate of the second flow meter 5b. The measured flow rate of the first flow meter 5a may be corrected by summing the measured flow rate of the second flow meter 5b to the measured flow rate of the first flow meter 5a. Summing the measured flow rates may comprise any suitable operation, including addition and subtraction.

For example, the measured flow rate of the first flow meter 5a may be subtracted from the measured flow rate of the second flow meter 5b, in accordance with the foregoing equation (4), to determine the estimated zero flow instability $\hat{m}_0$ of the first flow meter 5a. Accordingly, with reference to the foregoing equation (5), the corrected measured flow rate $\hat{m}_a$ may be determined using the estimated zero flow instability $\hat{m}_0$. Although the method 500 is discussed with reference to FIG. 4 and relationship/equations (3) through (5), alternative systems, relationship, and/or equations may be employed in alternative embodiments.

In the foregoing, the measured flow rates of the first and second flow meter 5a, 5b are described as being performed substantially simultaneously. However, in alternative embodiments, the measurements may be performed at different times. For example, the estimated zero flow instability $\hat{m}_0$ could be determined with flow rates that are measured substantially simultaneously, stored in the meter electronics 100, and used to correct subsequent measured flow rates of the first flow meter 5a. In addition, although the foregoing discusses determining the corrected measured flow rates in the fluid control system 400, which, as shown in FIG. 4, is a fuel control system that can dispense LNG, measured flow rates may be corrected in alternative systems. For example, the alternative systems can dispense marine fuels or the like. The alternative systems may also be employed in proving, custody transfer, or efficiency applications. Other applications and configurations of the alternative systems may be employed.

The embodiments described above provide the dual flow meter system 5, fluid control system 400, and method 500 to correct a measured flow rate. The dual flow meter system 5, fluid control system 400, and method 500 may use the first flow meter 5a to measure the flow rate of, for example, fuel flowing through the supply line SL shown in FIG. 4. The second flow meter 5b may measure the flow rate of the fuel flowing through the return line RL, which may be fluidly coupled to the first flow meter 5a in series. Due to, for example, the second flow meter 5b being in series with the first flow meter 5a, the fuel flow rates may be the same. However, the first flow meter 5a may have zero flow instability. Due to the zero flow instability, the flow rate measured by the first flow meter 5a may be different than the flow rate measured by the second flow meter 5b.

The measured flow rate of the first flow meter 5a may be corrected by the measured flow rate of the second flow meter 5b. For example, the measured flow rate of the first flow meter 5a may be summed with the measured flow rate of the second flow meter 5b. Accordingly, the zero flow instability, which may be accurately determined as a difference between the measured flow rates, can be corrected.

In addition, using the dual flow meter system 5 may be advantageous when the flow rate of the first flow meter 5a and the flow rate of the second flow meter 5b are measured substantially simultaneously. For example, when the first and second flow meter 5a, 5b are fluidly coupled in series, the fluid flow rate of, for example, fuel, may be the same through both the first and second flow meter 5a, 5b. Accordingly, utilizing the meter electronics 100 communicatively coupled to the first and second meter assembly 10a, 10b may ensure that the measurements are obtained at substantially the same time such that the measured flow rates may not include, for example, errors associated with timing issues between different meter electronics.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods for determining a corrected measured flow rate and not just to the embodiments described above and shown in the accompanying figures. Accordingly, the scope of the embodiments described above should be determined from the following claims.

We claim:

1. A method of determining a corrected measured flow rate, the method comprising:
    measuring a first flow rate with a first flow meter;
    measuring a second flow rate with a second flow meter, the second flow meter being fluidly coupled to the first flow meter in series with a vehicle connected between the first and second flow meters, the vehicle consuming a fluid during the measurement of the first and second flow rates; and
    correcting the first flow rate with an estimated zero flow instability comprising a difference between a prior first flow meter measurement and a prior second flow meter measurement, wherein the prior first flow meter measurement and the prior second flow meter measurement are made at a time when the vehicle was not consuming the fluid,
    wherein a first flow meter zero flow instability is greater than a second flow meter zero flow instability.

2. The method of claim 1, wherein a first flow meter pipe diameter of the first flow meter is greater than a second flow meter pipe diameter of the second flow meter.

3. The method of claim 1, wherein the first flow rate and the second flow rate are measured simultaneously.

4. The method of claim 1, wherein the estimated zero flow instability is stored in a meter electronics.

5. A dual flow meter system (5) for determining a corrected measured flow rate, the dual flow meter system (5) comprising:
    a first flow meter (5a);
    a second flow meter (5b) fluidly coupled in series with the first flow meter (5a) with a vehicle connected between the first and second flow meters; and
    at least one meter electronics (100) communicatively coupled to the first flow meter (5a) and the second flow meter (5b), the at least one meter electronics (100) being configured to receive a first flow rate measured with the first flow meter, receive a second flow rate measured with the second flow meter, with the vehicle consuming a fluid during the measurement of the first flow rate and the second flow rate, and correct the first flow rate with an estimated zero flow instability comprising a difference between a prior first flow meter measurement and a prior second flow meter measurement, wherein the prior first flow meter measurement and the prior second flow meter measurement are made at a time when the vehicle was not consuming the fluid,
    wherein a first flow meter instability is greater than a second flow meter zero flow instability.

6. The dual flow meter system (5) of claim 5, wherein a first flow meter pipe diameter of the first flow meter is greater than a second flow meter pipe diameter of the second flow meter.

7. The dual flow meter system (5) of claim 5, wherein the first flow rate and the second flow rate are measured simultaneously.

8. The dual flow meter system (5) of claim 5, wherein the estimated zero flow instability is stored in the at least one meter electronics (100).

9. A fluid control system (400) for determining a corrected measured flow rate, the fluid control system (400) comprising:
    a supply line (SL) with a first flow meter (5a);
    a return line (RL) with a second flow meter (5b) fluidly coupled in series with the first flow meter (5a); and
    one or more meter electronics (100) communicatively coupled to the first flow meter (5a) and the second flow meter (5b);
    a vehicle connected between the first flow meter (5a) and the second flow meter (5b);
    wherein at least one of a system controller (410) is communicatively coupled to the one or more meter electronics (100) and the one or more meter electronics (100) is configured to receive a first flow rate measured with the first flow meter, receive a second flow rate measured with the second flow meter, with the vehicle consuming a fluid during the measurement of the first flow rate and the second flow rate, and correct the first flow rate with an estimated zero flow instability comprising a difference between a prior first flow meter measurement and a prior second flow meter measurement, wherein the prior first flow meter measurement and the prior second flow meter measurement are made at a time when the vehicle was not consuming the fluid,
    wherein a first flow meter zero flow instability is greater than a second flow meter zero flow instability.

10. The fluid control system (400) of claim 9, wherein a first flow meter pipe diameter of the first flow meter is greater than a second flow meter pipe diameter of the second flow meter.

11. The fluid control system (400) of claim 9, wherein the first flow rate and the second flow rate are measured simultaneously.

12. The fluid control system (400) of claim 9, wherein the estimated zero flow instability is stored in the one or more meter electronics (100).

* * * * *